(12) United States Patent
Kroll et al.

(10) Patent No.: US 6,198,249 B1
(45) Date of Patent: Mar. 6, 2001

(54) THERMAL BOOSTER BATTERY SYSTEM

(76) Inventors: Mark W. Kroll, 493 Sinaloa Rd., Simi Valley, CA (US) 93065; Karl J. F. Kroll, 6427 Ithaca La. North, Maple Grove, MN (US) 55311

( * ) Notice: Subject to any disclaimer, the term of this patent is extended or adjusted under 35 U.S.C. 154(b) by 0 days.

(21) Appl. No.: 09/504,500

(22) Filed: Feb. 15, 2000

(51) Int. Cl.[7] ....................................... H02J 7/00
(52) U.S. Cl. ............................... 320/104; 320/103
(58) Field of Search ................................. 320/104, 103, 320/105; 307/64, 66, 149; 429/96–100

(56) References Cited

U.S. PATENT DOCUMENTS

| | | | |
|---|---|---|---|
| 3,669,388 | * 6/1972 | Van Kreuningen | 244/138 R |
| 4,350,746 | 9/1982 | Chambers | 429/121 |
| 4,522,166 | 6/1985 | Toivio et al. | 123/196 A |
| 4,983,473 | 1/1991 | Smith | 429/48 |
| 5,030,526 | 7/1991 | Braswell | 429/113 |
| 5,077,513 | 12/1991 | Dea et al. | 320/115 |
| 5,107,197 | 4/1992 | Arlinghaus | 320/105 |
| 5,108,848 | 4/1992 | Kramer | 429/48 |
| 5,194,799 | 3/1993 | Tomantschger | 320/103 |
| 5,214,368 | 5/1993 | Wells | 320/105 |
| 5,230,637 | * 7/1993 | Weber | 320/105 |
| 5,525,847 | 6/1996 | Aronne | 307/125 |
| 5,589,292 | 12/1996 | Rozon | 429/170 |
| 5,793,185 | 8/1998 | Prelec et al. | 320/104 |
| 6,041,255 | * 3/2000 | Kroll | 607/5 |

* cited by examiner

Primary Examiner—Peter S. Wong
Assistant Examiner—Lawrence Luk

(57) ABSTRACT

A pyrotechnic self-consuming battery for emergency booster battery applications. Such a system can only be used once as the battery self-destructs but could be very useful for emergency starting of cars, trucks or airplanes. This invention allows for a system weighing approximately 1/50th that of existing systems with comparable significant reductions in volume. An essentially infinite shelf life also obtains with the invention.

23 Claims, 7 Drawing Sheets

THERMAL BOOSTER BATTERY SYSTEM

BACKGROUND OF THE INVENTION

Portable battery systems for emergency jump starts of motors are well known and seen in practically every service station.

Many variations on the theme of a portable battery for jump starting have been taught. For example, Chambers in U.S. Pat. No. 4,350,746 issued Sep. 21, 1982 teaches a portable jump starting battery which uses sliding plates to make contacts to the dead battery rather than cables.

Smith in U.S. Pat. No. 4,983,473 issued Jan. 8, 1991 teaches the placement of two motorcycle batteries in a polypropylene box. Smith observes that this system weighs only 18 pounds which is a significant improvement over the weight of conventional automobile battery of 58 pounds. This is still excessive weight for something to be permanently carried in an automobile for emergency use and, due to the self discharge of lead acid batteries, will have a very short shelf life. Thus, such a system is not suitable for an emergency or for charging in general. Braswel in U.S. Pat. No. 5,030,526 issued Jul. 9, 1991 teaches the use of a emergency battery with the electrolytic fluid stored separately from the plates. In emergency use the fluid would be emptied into the battery to allow the generation of current. The segregation of the electrolytic fluid from the battery plates allows the battery to have nearly infinite shelf life. However such a system still requires extremely high weight and has the difficulty of the dangerous fluid storage with a typical fluid being sulfuric acid. Dea et al. in U.S. Pat. No. 5,077,513 issued Dec. 31, 1991 teaches a cart with wheels to carry an emergency jump starting battery.

Arlinghaus in U.S. Pat. No. 5,107,197 issued Apr. 21, 1992 teaches the use of a small 2-volt battery to be placed in series with the primary battery. This is claimed to assist in car starting in that the higher voltage will spin the starter harder. Unfortunately this requires the mechanical work of removing at least one of the battery cables if this is to be used in a surprise emergency situation.

Kramer in U.S. Pat. No. 5,108,848 issued in Apr. 28, 1992 teaches the use of a split battery design. In this system the normal operation of the vehicle only uses half of the battery while the other half is always left for reserve. Unfortunately, this means that there is a significant compromise made in the capabilities due to the fact that only half of the battery is available normally.

Tomantschger in U.S. Pat. No. 5,194,799 issued Mar. 16, 1993 teaches a booster battery assembly in which the electrolyte is again stored separately from a dry battery, similarly to Braswel.

Wells in U.S. Pat. No. 5,214,368 issued May 25, 1993 teaches a battery jumper system with spooled retractable cables.

Rozon in U.S. Pat. No. 5,589,292 issued Dec. 31, 1996 teaches a jump starting system in which protective holsters are used to lodge the connecting cables.

Prelec et al. in U.S. Pat. No. 5,793,185 issued Aug. 11, 1998 teaches a jump start system within which an internal rechargeable battery which may be either recharged from an AC or DC source.

In spite of the obvious need for a simple, small, reliable emergency jump start system which could be carried in, for example, a glove compartment, none have been taught. None of the systems listed above have appropriate technology for such a device.

DETAILED DESCRIPTION OF THE DRAWINGS AND PREFERRED EMBODIMENT

Figure 1:
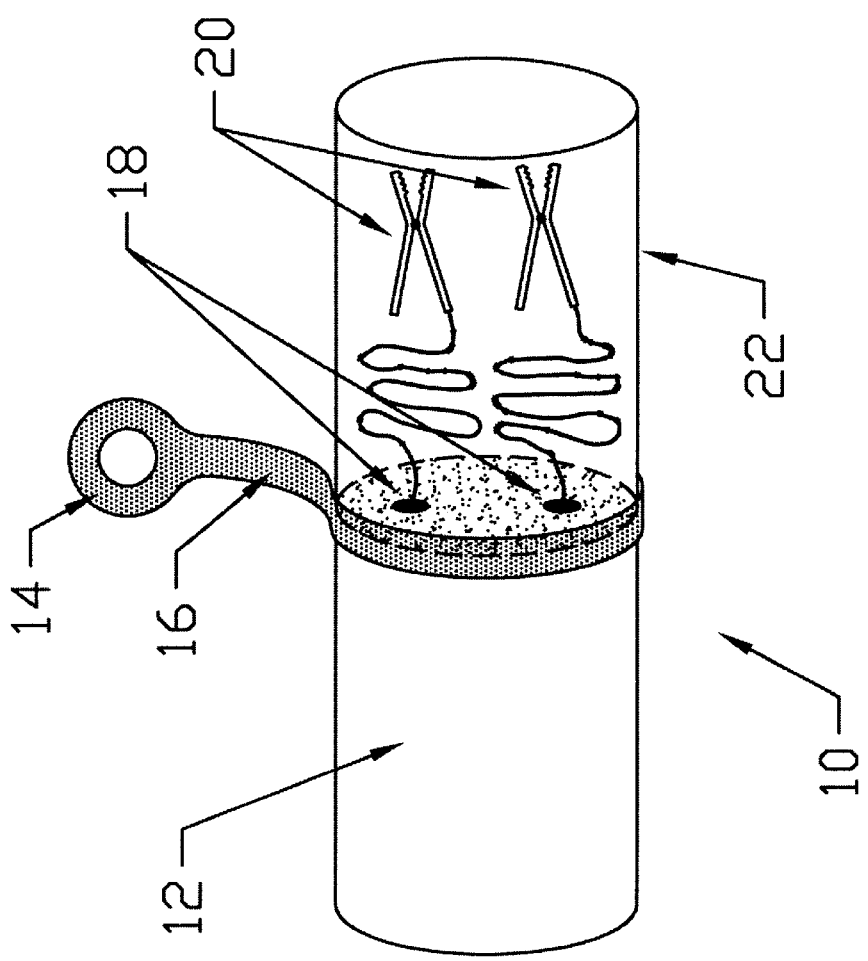
FIG. 1: Simplified sketch of the thermal jump start system.

FIG. 1 shows a simplified sketch of system 10. The system consists of a thermal battery in cylindrical subsection 12 attached with a peel-away strip material 16 to the cable containing cylindrical subsection 22.

Within the subsection 22 is contained the clamps 20 which are attached at points 18 to the output of the thermal battery. Release ring 14 is used to release section 22.

The key element of this invention is the use of a thermal battery for an emergency jump start system. To the best of the inventor's knowledge, thermal batteries have never been used for any non-military applications. This is because of their single time usage. They have been considered ideal for many military applications such as for powering an ejection seat in a fighter jet. This application is taught in Aronne in U.S. Pat. No. 5,525,847 issued Jun. 11, 1996. The thermal batteries have also been used for various artillery and missile applications where the device is only intended to be used once. Ser. No. 09/061,755 teaches the possible use of a thermal battery for a single use external defibrillator.

Figure 2:
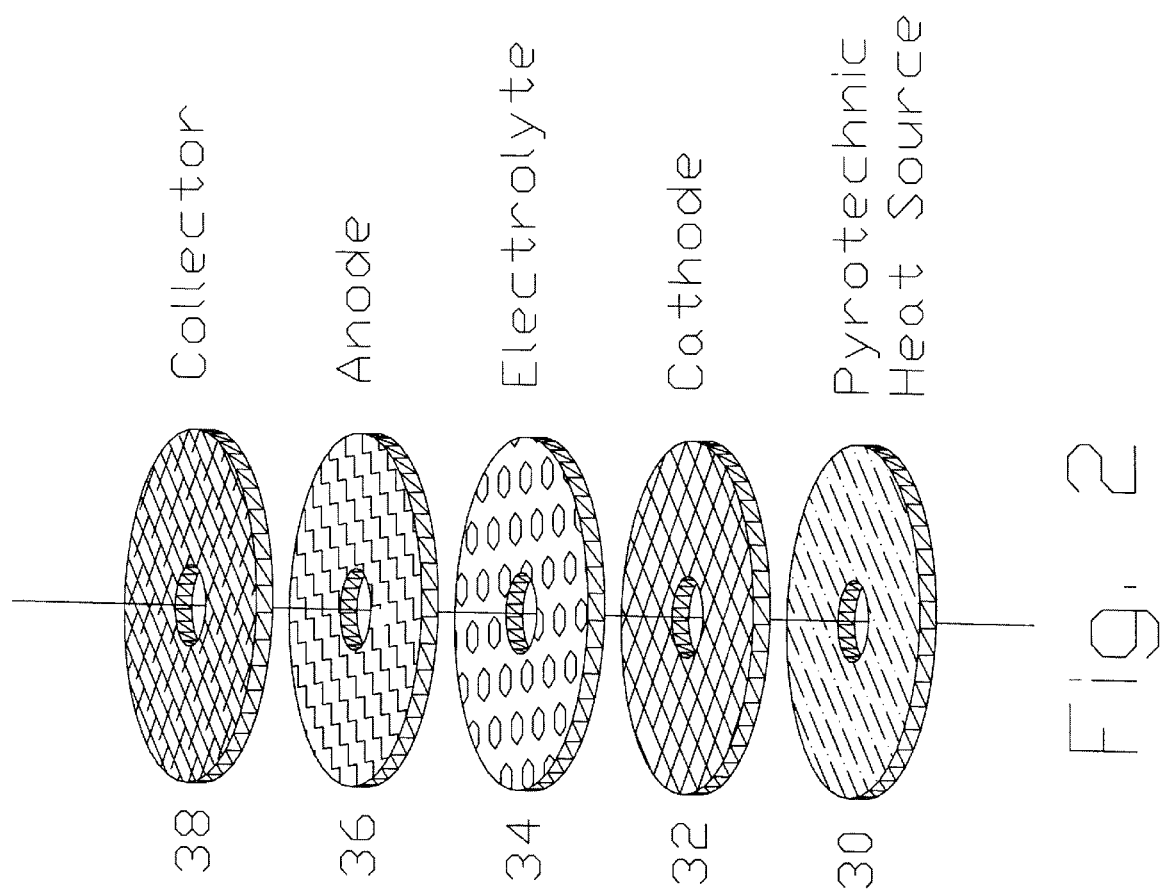
FIG. 2: Internal structure of a thermal battery pile.

The detailed construction of the piles of a thermal battery is shown in FIG. 2. It begins with a pyrotechnic heat source 30 which is followed by cathode 32 which is followed by an electrolyte 34 followed by an anode 36 followed by current collector 38. The electrolyte at normal ambient temperature is a solid, insulating inorganic salt. The electrolyte is rendered molten by the pyrotechnic heat source. The heat melts the electrolyte which causes it to be conductive and deliver electrical power at an extremely high rate. The thermal battery has many attributes making it ideal for an emergency jump start system. First, it has no leakage current until it is triggered. Thus it has a shelf life of ten or twenty years. It then delivers current at an extremely high rate for a short period of time on the order of minutes. This is ideal for cranking a dead car over, especially at low temperatures.

Representative materials for the battery anode include lithium, calcium, magnesium, and others. The electrolytes that have been used successfully in these batteries have been lithium chloride and potassium chloride mixtures primarily. Representative cathodes are $FeS_2$, $K_2$, $Cr_2O_7$, $WO_3$, $CaCrO_4$, and $V_2O_5$ for example. A typical pyrotechnic heat source is iron with $KClO_4$.

Figure 3:
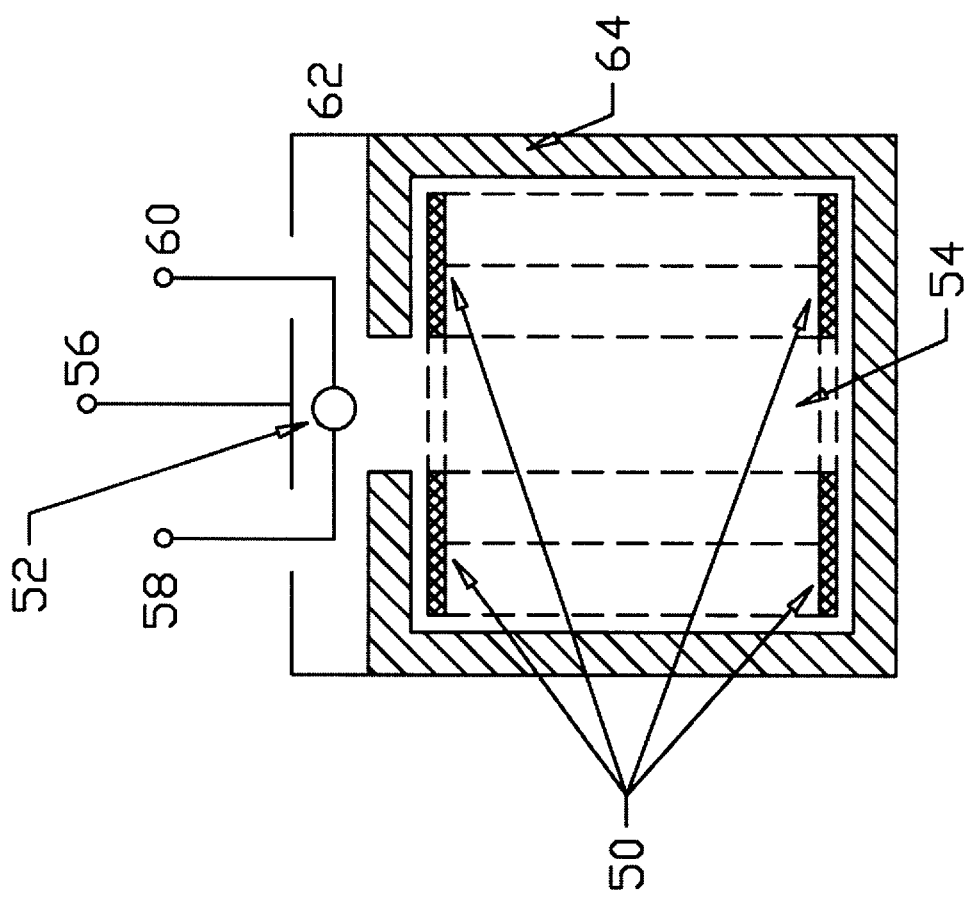
FIG. 3: Basic design of a complete thermal battery.

FIG. 3 shows the overall construction of a thermal battery. Battery piles 50 are shown stacked as discs leaving an open core 54. The electric match 52 is placed above that open core. Electric match 52 is ignited by current passing through electrodes 58 and 60. Connection 56 is used for delivery of current from the battery and the other connection can be one of the match terminals, either 58 or 60. As an alternative, yet a fourth electrode could be used for the battery output current. Insulation material 64 is wrapped around the battery to keep it very hot so that it can achieve its high levels of efficiencies. Temperatures on the order of 230° Celsius are not uncommon. Representative insulation that can be used include Mica, silicon-bonded Mica, FiberFrax, Microtherm, Aluminum/Mica combinations, and Min-K.

In the embodiment using an electric match to trigger the thermal battery, a conventional non-thermal small battery such as a lithium battery will deliver current when connected through the electric match circuitry. This will cause the thermal battery to go to its high temperature mode and then deliver current at an extremely high level.

Figure 4:
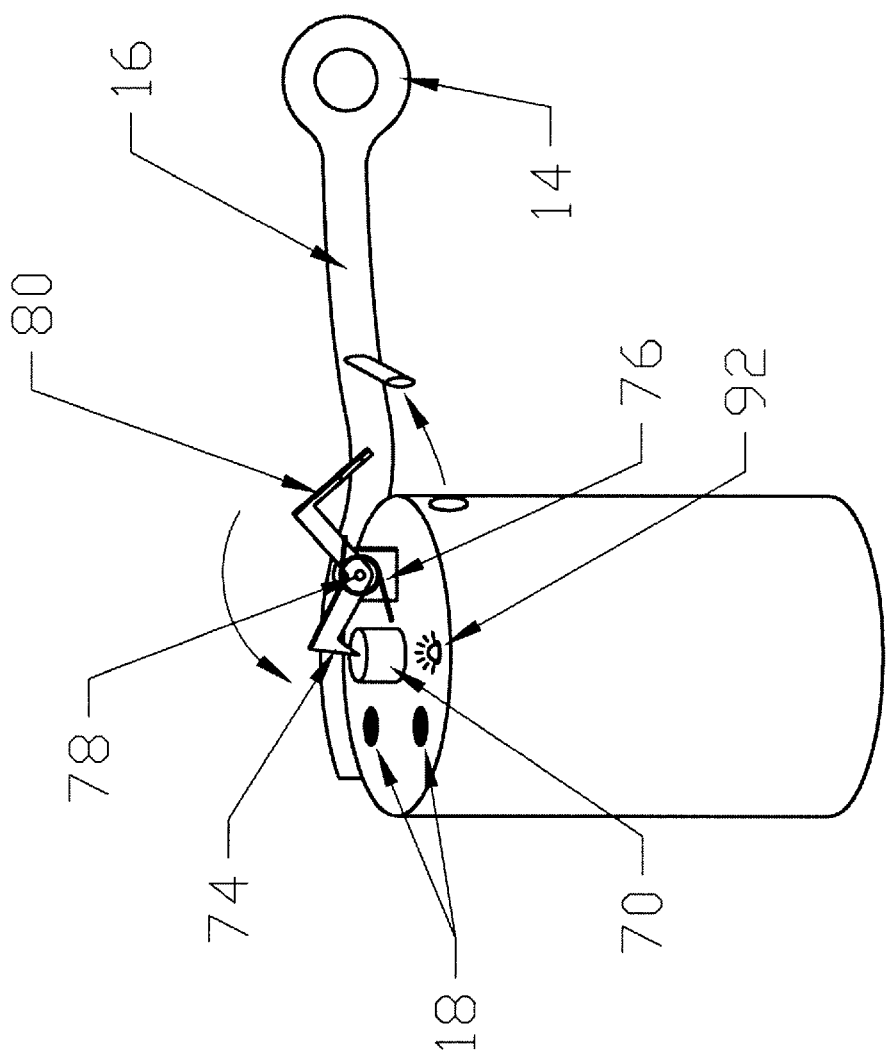
FIG. 4: Detail of the percussion ignition system embodiment.

A preferred embodiment for this invention is shown in FIG. 4. In this case the electric match is replaced by percussion igniter 70. This is essentially a primer from a shotgun shell. This has impact activated explosives. A spring loaded percussion ignition system comprises the firing pin 74, spring 76 and a base pivot pin 78. The far end of the percussion system 80 is retained under the release rim of the release peel-away strip 16. In operation when the pin 14 is pulled to remove the release peel-away strip 16 the back of the percussion system lever 80 will be released and the firing pin 74 will contact the percussion igniter 70 to begin the thermal battery ignition process. This will then allow the thermal battery to begin delivering extremely high currents.

Figure 5:
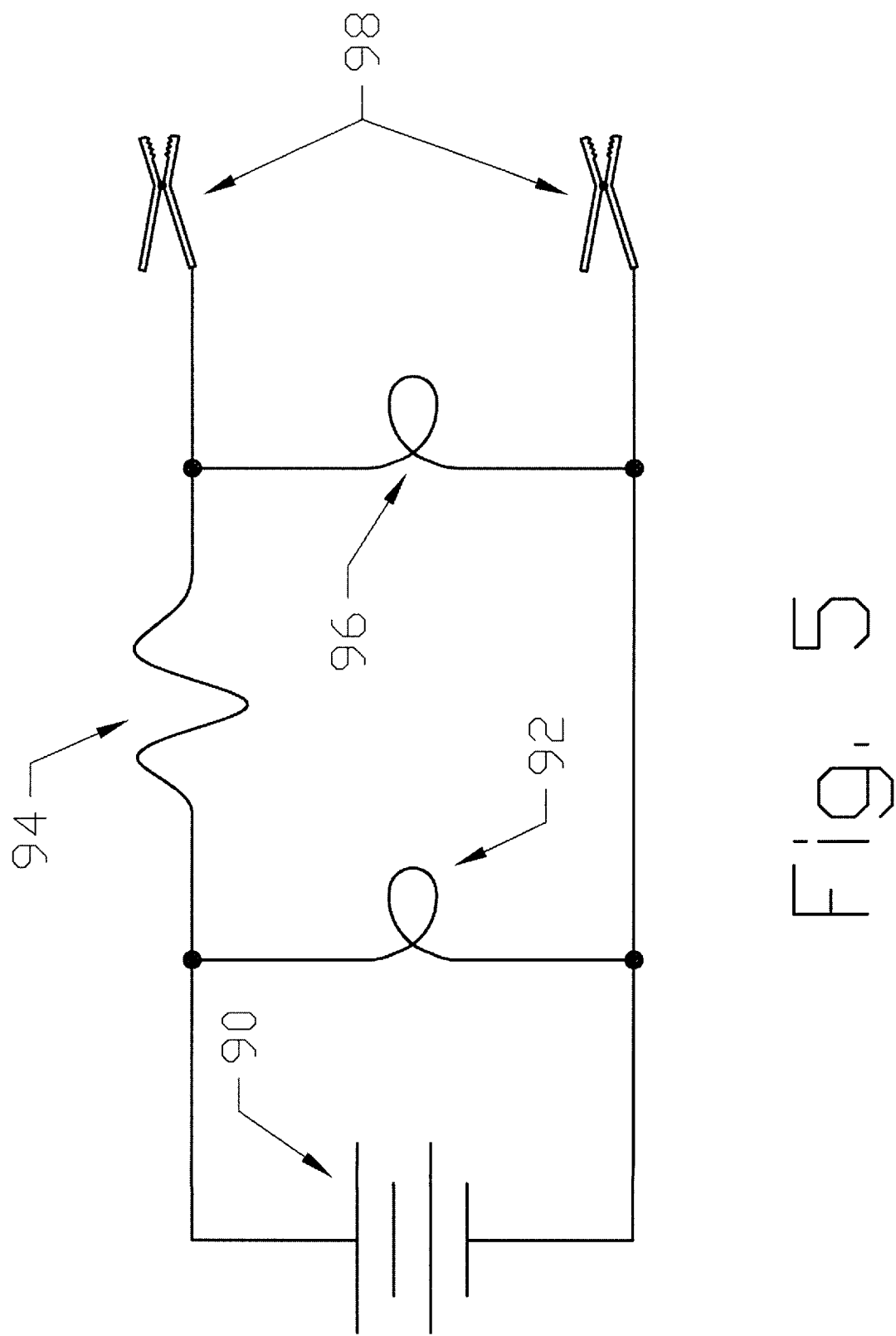
FIG. 5: Basic schematic of the percussion ignition system embodiment.

FIG. 5 shows a basic schematic of the percussion ignition system embodiment which is a preferred embodiment for this device. Thermal battery 90 delivers current at a open circuit voltage range of 8–24 volts through fuse 94 into the attachment clips 98. Light 92 being connected directly across thermal battery indicates the use of thermal battery is generating voltage. Light 96 being connected after the fuse indicates that there is electrical voltage going through the fuse. This will diagnose potential fuse blowing.

An alternative to the clips 98 could be various types of circular lugs or spade lugs or could be circular clamps to fit right on the battery terminals.

Figure 6:
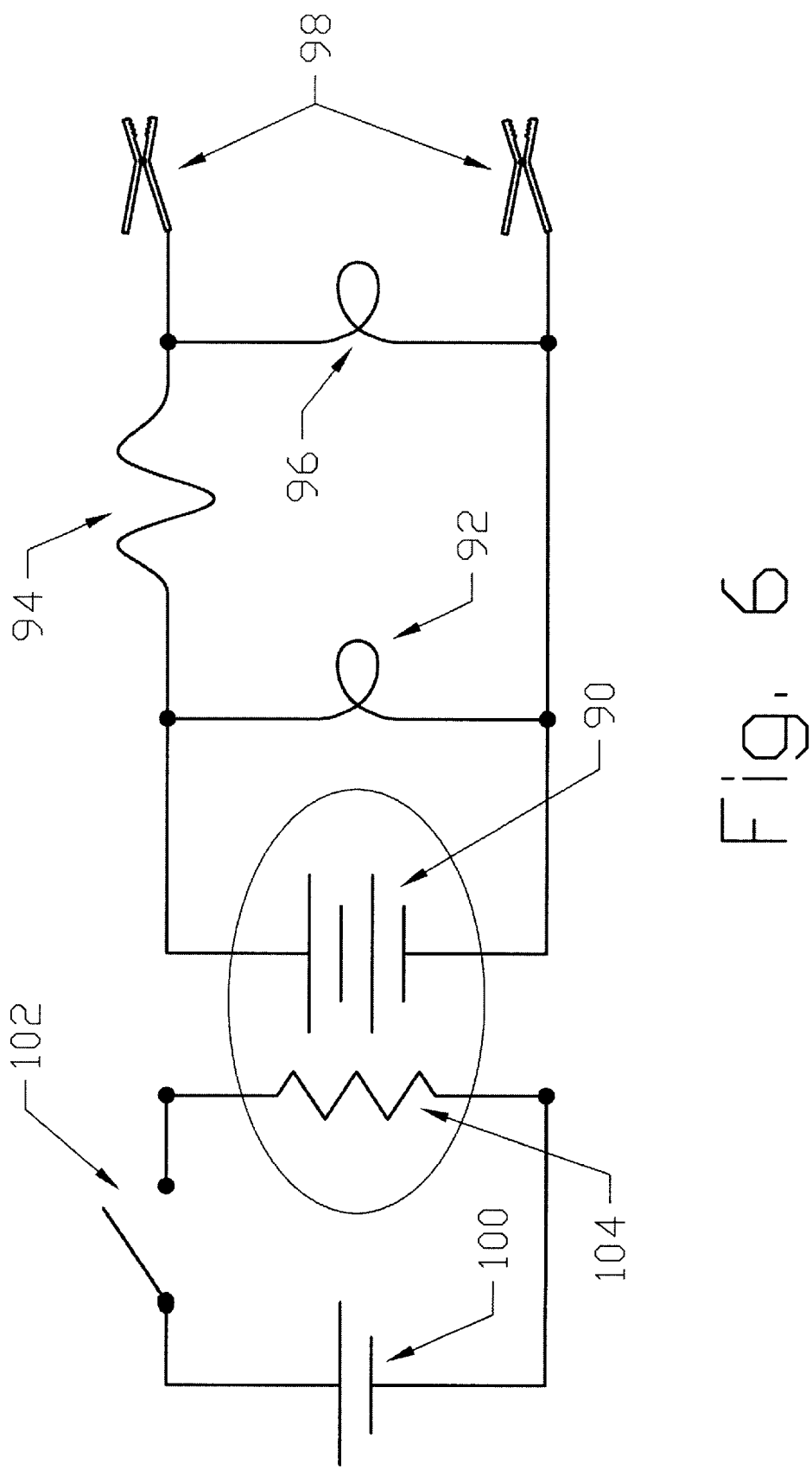
FIG. 6: Basic schematic of the electrical ignition system embodiment.

FIG. 6 shows a schematic for the electric match embodiment of the present invention. A conventional non-thermal battery 100 is used to deliver current when switch 102 is activated to the electric match 104. This electric match will then ignite the thermal battery 90 and the rest of the circuit schematic as before. Battery 100 could be from a large family of non-thermal batteries including high-current lithium batteries, manganese dioxide, or alkaline and carbon-zinc batteries. The high-current lithium batteries have the advantage of operating at low temperatures thus making the device more suitable for northern climate emergency winter use.

The preferred voltage range for the thermal battery 90 is from 14 to 20 volts as this is sufficient to assist a dead battery without being so high as to damage electrical components in a car.

A suitable thermal battery would deliver 60,000 joules. A typical thermal battery can deliver around 200 joules per cubic centimeter giving a size of about 300 cm³. This would allow, for example, starting in a scenario with 10-volt output with 100 amperes (which implies heavy cranking) for about one minute. In the alternative this would allow lighter currents for a longer time. A thermal battery with the ability to deliver 60,000 joules is about 4 inches long by about 2-½ inches in diameter. This is approximately the size of a soft drink can and thus as easily storable in a glove compartment or trunk.

Figure 7:
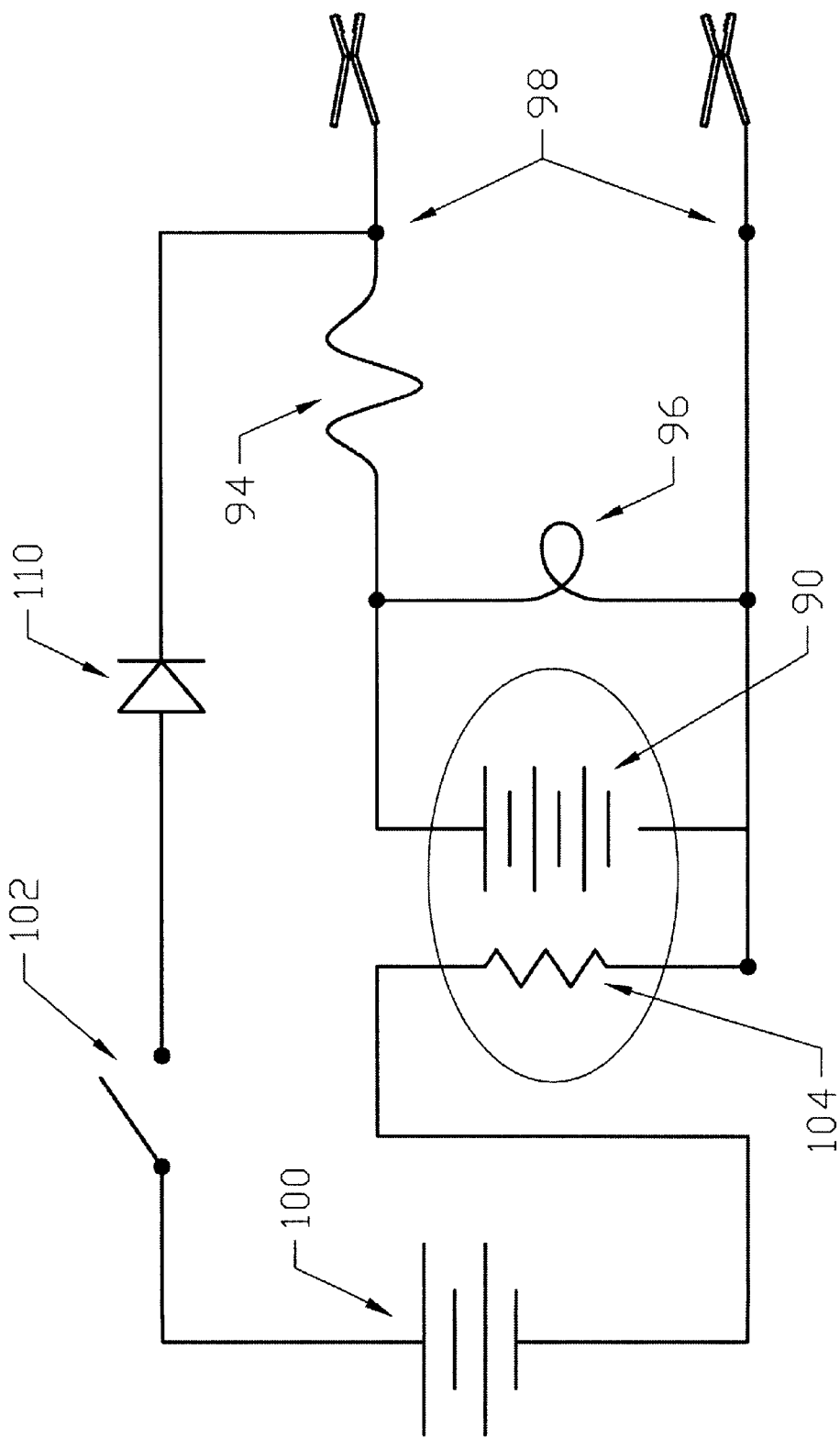
FIG. 7: Basic schematic of an embodiment of the electrical ignition system which performs a continuity check.

FIG. 7 shows an embodiment of the present invention that checks for continuity before it ignites the thermal battery. Many people have experienced the frustration of jump starting a car when the connection was bad and then having to "wiggle" cables until a good connection was established. In the case of a one-shot thermal battery the results of a bad connection could be disastrous. Someone using the device all by themselves would have to lift the hood and connect the thermal jump start to the battery and trigger the ignition. They would then have to go inside the car and attempt to start the car. If the connection was bad the thermal battery could burn itself out before the connection problem was fixed.

This problem is addressed in FIG. 7. In this case the conventional non-thermal battery 100 has its anode routed through activation switch 102 and diode 110 down to the car battery through connections at 98. When the activation switch 102 is set then the current from non-thermal battery 100 flows through the switch 102 and diode 110 through the car battery only if there is a good connection to the car battery. That current then continues to flow through the electric match 104 to ignite the thermal battery. Once the thermal battery is ignited it will generate a much higher voltage and that is blocked by diode 110 to prevent the non-thermal battery from exploding. Other refinements of this invention include various lights to verify the current flow and presence of voltage, etc. Suitable batteries are manufactured by the Eagle Pitcher Company of Joplin, Mo.

It is important to realize that the term thermal battery has two different uses in the art which have absolutely no relation to each other. The most common usage and the usage in the instant invention is to describe a battery that requires an active thermal process to deliver electrical current. The term thermal battery is also used (primarily in Europe) to describe a heat-storage system. For example, U.S. Pat. No. 4,522,166 of Toivio of Finland discusses a container for circulating oil or water as a thermal battery This has no technical or scientific connection to the thermal battery of conventional American usage.

We claim:

1. An emergency motor starting energy delivery apparatus consisting of:

a thermal electric battery, an activation system operably connected to the thermal electric battery to ignite the thermal electric battery, a positive conductor connected to the positive output of the thermal battery, a negative conductor connected to the negative output of the thermal battery, temporary connectors sized for releasably securing the emergency motor starting energy delivery apparatus to an automobile battery connected to the positive and negative conductors so as to allow the flow of electrical current from the thermal electric battery to a motor vehicle battery for emergency jump starting.

2. The emergency motor starting energy delivery apparatus of claim 1 in which the thermal electric battery is activated by a conventional non-thermal battery system operably connected to the thermal electric battery.

3. The emergency motor starting energy delivery apparatus of claim 1 in which the thermal electric battery is activated by a percussion ignition device system operably connected to the thermal electric battery.

4. The emergency motor starting energy delivery apparatus of claim 1 in which the apparatus is activated by the operation of a pull release mechanism operably connected to the thermal electric battery.

5. The emergency motor starting energy delivery apparatus of claim 1 in which a protective fuse is inserted between the thermal electric battery and the temporary connectors sized for releasably securing the emergency motor starting energy delivery apparatus to an automobile battery.

6. The emergency motor starting energy delivery apparatus of claim 1 with an indicator light operably connected to the thermal electric battery indicating the presence of voltage from the thermal electric battery.

7. The emergency motor starting energy delivery apparatus of claim 1 with an indicator light, operably connected to the temporary connectors sized for releasably securing the emergency motor starting energy delivery apparatus to an automobile battery, indicating the presence of electric voltage beyond the fuse from a thermal electric battery.

8. The emergency motor starting energy delivery apparatus of claim 1 with means for verifying the continuity of the connection to the motor vehicle battery before the system may activate.

9. An emergency motor jump start energy delivery system consisting of, a thermal battery, ignition means operably connected to the thermal electric battery to ignite the thermal battery, temporary connection means sized for attachment to an automobile battery to connect the output of the thermal battery to the motor vehicle battery to be jump started, so that motor vehicle can be jump started in an emergency from a small portable emergency motor starting energy delivery system.

10. The emergency motor jump start energy delivery system of claim 9 in which the output voltage is between 8 and 24 volts.

11. The emergency motor jump start energy delivery system of claim 9 in which the output voltage is between 14 and 20 volts.

12. The emergency motor jump start energy delivery system of claim 9 in which the temporary connection means, sized for attachment to an automobile battery to connect the output of the thermal battery to the motor vehicle battery to be jump started, are spring loaded alligator clamps as shown in FIG. 1.

13. The emergency motor jump start energy delivery system of claim 9 in which the temporary connection means, sized for attachment to an automobile battery to connect the output of the thermal battery to the motor vehicle battery to be jump started, are circular lugs.

14. The emergency motor jump start energy delivery system of claim 9 in which the temporary connection means, sized for attachment to an automobile battery to connect the output of the thermal battery to the motor vehicle battery to be jump started, are circular clamps.

15. The emergency motor jump start energy delivery system of claim 9 in which the temporary connection means, sized for attachment to an automobile battery to connect the output of the thermal battery to the motor vehicle battery to be jump started, are spade lugs.

16. The emergency motor jump start energy delivery system of claim 9 in which the temporary connection means, sized for attachment to an automobile battery to connect the output of the thermal battery to the motor vehicle battery to be jump started, are spring loaded alligator clamps as shown in FIG. 1.

17. A method of performing an emergency jump start of a motor vehicle comprising the steps of:

connecting a thermal battery to the motor vehicle battery to be jump started with temporary connection means, sized for attachment to a motor vehicle battery, igniting the thermal battery, waiting for the thermal battery to develop full voltage, engaging the starter motor of the motor vehicle while the thermal battery is at or near full voltage, and thus starting the motor vehicle on an emergency basis with the use of a small portable apparatus.

18. The method of performing an emergency jump start of a motor vehicle of claim 17 in which a fuse is interposed between the thermal battery and the motor vehicle battery to be jump started with temporary connection means.

19. The method of performing an emergency jump start of a motor vehicle of claim 17 in which an indicator light is connected to the thermal battery to indicate when the thermal battery is producing sufficient voltage for starting the motor vehicle on an emergency basis.

20. The method of performing an emergency jump start of a motor vehicle of claim 17 in which an indicator light is connected to the thermal battery to indicate when the thermal battery is producing sufficient voltage for starting the motor vehicle on an emergency basis.

21. The method of performing an emergency jump start of a motor vehicle of claim 17 in which the step of igniting the thermal battery is performed by connecting a lithium battery to the electric match of the thermal battery.

22. The method of performing an emergency jump start of a motor vehicle of claim 17 in which the connection to the motor vehicle battery is automatically verified before allowing the ignition of the thermal battery.

23. The method of performing an emergency jump start of a motor vehicle of claim 17 in which the step of igniting the thermal battery performed by pulling an activation mechanism for a mechanical percussion igniter.

\* \* \* \* \*